United States Patent [19]

Mazin et al.

[11] Patent Number: 5,188,861
[45] Date of Patent: Feb. 23, 1993

[54] PROCESS FOR PREPARING A DRIED FRUIT PRODUCT

[75] Inventors: Jack G. Mazin, Maple; Amir Lalji, Weston, both of Canada

[73] Assignee: Royal Domaine Inc., Concord, Canada

[21] Appl. No.: 530,863

[22] Filed: May 31, 1990

[51] Int. Cl.$^5$ ............................................. A23L 1/212
[52] U.S. Cl. .................................... 426/640; 426/639
[58] Field of Search ................................ 426/640, 639

[56] References Cited

U.S. PATENT DOCUMENTS

| 1,609,720 | 12/1926 | Humphrey | 426/640 |
| 1,717,489 | 6/1929 | Barlow | 426/640 |
| 4,542,033 | 9/1985 | Agarwala | 426/640 X |

FOREIGN PATENT DOCUMENTS

| 61-216641 | 9/1986 | Japan | 426/640 |

OTHER PUBLICATIONS

Furia, CRC Handbook of Food Additives, vol. I, 1972, CRC Press Inc.: Cleveland, pp. 225-253.

*Primary Examiner*—Joseph Golian
*Attorney, Agent, or Firm*—Bereskin & Parr

[57] ABSTRACT

A process for preparing a flavored dried fruit product having a flavor which does not substantially correspond to the natural flavor of the dried fruit is provided. As a first step, a dried fruit is treated with an acidulant being selected from the group consisting of tartaric acid, malic acid, citric acid, ascorbic acid, phosphoric acid, and fumaric acid in an amount and for a period of time which is sufficient to substantially remove the natural flavor of the dried fruit. As a second step, the treated dried fruit is then dehydrated to the desired moisture content. The dried fruit is treated during the first step or after the second step with a flavoring agent having a flavor which does not correspond to the natural flavor of the dried fruit. The flavoring agent is employed in an amount and for a period of time which is sufficient to impart to the dried fruit a flavor which is substantially the same as the flavoring agent.

7 Claims, No Drawings

PROCESS FOR PREPARING A DRIED FRUIT PRODUCT

BACKGROUND OF THE INVENTION

The invention relates to the field of dry fruits, and particularly, to a new dried fruit product having a flavor which does not substantially correspond to the natural flavor of the dried fruit, and a process for preparing the product.

Dried fruits such as raisins, prunes, apples, apricots, and peaches are recognized as highly nutritious food products. Raisins, for example, are a good source of iron, and they supply calcium, magnesium, potassium, phosphorous, B vitamins, protein and dietary fibre. (Foods and Food Production Encyclopedia, Considine, D.M. ed., Van Nostrand Reinhold Company, New York 1982, pages 1639-1942). Dried fruits are utilized as snack foods, confectionaries, etc., and as ingredients in foods such as snack foods, confectionaries, biscuits, cookies, cakes, dairy products, cereals, etc.

There is a need for dried fruit products which are inexpensive, have an appealing taste, aroma and texture, and are nutritious. Fruit leather products which are commercially available are expensive and contain ingredients such as sweeteners which make them nutritionally less desirable. Many of the sun dried or artificially dried fruits commercially available do not have an appealing taste, aroma or texture and therefore are not readily consumable as snack foods or readily incorporated into foods such as confectionaries, biscuits, cereals, etc.

There is also a need for a new and useful process which is capable of producing dried fruit products which retain more of their shape, size and natural nutrients, while imparting desirable taste, texture and aroma qualities to the dried fruit products.

U.S. Pat. No. 1,717,489 (issued Jun. 18, 1929 to Barlow) discloses a method of changing the flavor of dried fruits comprising combining the expressed juice of one fruit with another fruit which has been sun-dried or evaporated or which is in the process of drying. In one method disclosed a dry or drying fruit is immersed in the fruit juice of another fruit for a short time and then put again to dry; the process being repeated until the desired result is fully obtained. The method disclosed in the reference leaves much to be desired in terms of processing efficiency and processing costs and the tendency of the fruit juice to ferment over time may result in a product having an alcoholic taste. In addition, the absence of preservatives in the fruit juice and/or repeated applications of the fruit juice to the dry or drying fruit may introduce undesirable microorganisms into the dried fruit product shortening the shelf life of the product and more importantly, rendering the product harmful to consumers. Further, the repeated application of the fruit juice to the dry or drying fruit increases the sugar content resulting in a sticky product which is nutritionally less desirable. Repeated drying of the fruit also reduces the content of nutrients and volatiles in the fruit which effects the nutritional, and aroma and flavor qualities, respectively of the product.

SUMMARY OF THE INVENTION

The present invention provides dried fruit products, particularly raisins, having flavors which do not correspond to the natural flavor of the dried fruits and having desirable nutritional, texture and aroma qualities; and a process for preparing the dried fruit products. The improvements in the product attributes provided by the dried fruit products of the invention compared to prior art products is in texture, flavor, nutrition and aroma. The improvements are realized using the easily carried out process of the present invention.

Broadly stated, the present invention provides a process for preparing a flavored dried fruit product said process comprising:

(a) treating a dried fruit with an acidulant being selected from the group consisting of tartaric acid, malic acid, citric acid, ascorbic acid, phosphoric acid and fumaric acid, in an amount and for a period of time which is sufficient to substantially remove the natural flavor of the dried fruit;

(b) dehydrating the treated dried fruit to obtain a desired moisture content; and, (c) treating the dried fruit during step (a) or after step (b) with a flavoring agent having a flavor which does not substantially correspond to the natural flavor of the dried fruit, said flavoring agent being employed in an amount and for a period of time which is sufficient to impart to the dried fruit a flavor which is substantially the same as the flavoring agent; and so forming a flavored dried fruit product having a flavor which is substantially the same as the flavor of said flavoring agent and having an outer surface which is substantially non-sticky whereby the flavored dried fruit product may be easily handled.

In one embodiment of the invention, a process for preparing a flavored raisin product is provided which process comprises a one step rehydration of raisins in a flavor solution comprising water, an acidulant, and a flavoring agent, and optionally comprising one or both of a sweetening agent and a colouring agent, said flavor solution being employed in an amount of about 10 to 100% by weight of final product, said acidulant being selected from the group consisting of tartaric acid, malic acid, citric acid, ascorbic acid, phosphoric acid and fumaric acid and being employed in an amount of 0.1 to 2.5% by weight of final product, said flavoring agent having a flavor which does not substantially correspond to the natural flavor of the raisins, said rehydration step being employed for a period of time to permit the flavor solution to stabilize in the raisins and to impart to the raisins a flavor which is substantially the same as the flavoring agent, and washing the rehydrated raisins to substantially remove any residual of the flavor solution on the outer surface or skin of the raisins, and a one step dehydration of the washed rehydrated raisins to obtain a desired moisture content, and so forming a flavored raisin product having a flavored meat comprising the flavor of the flavoring agent, and having an outer surface which is substantially non-sticky whereby the raisin product may be easily handled.

In a second preferred embodiment of the invention, a process for preparing a flavored raisin product is provided which process comprises treating raisins with an acidulant being selected from the group consisting of tartaric acid, malic acid, citric acid, ascorbic acid, phosphoric acid and fumaric acid, said acidulant being employed in an amount and for a period of time sufficient to provide raisins wherein the natural flavor of the raisins is substantially removed; dehydrating the so treated raisins to obtain a desired moisture content in the raisins, and treating the dehydrated raisins with a flavoring agent having a flavor which does not substantially correspond to the natural flavor of the raisins, said flavoring agent being employed in an amount and for a period of time which is sufficient to impart to the raisins a flavor which is substantially the same as the flavoring agent; and so forming a flavored raisin product having a flavor which is substantially the same as the flavor of the flavoring agent and having an outer surface which is substantially non-sticky whereby the flavored raisin product may be easily handled.

The process of the invention, by employing minimal steps, economically decreases the time and ingredients required to obtain a dried fruit product with a desired taste, aroma and texture. The processing temperatures and times also make it possible to produce flavored dried fruit products having little or no loss of natural nutrients. Another feature of the present invention is the improved flow properties attained when the process is employed. Using conventional methods such as Barlow, the dried fruit products may form lumps which cause difficulties in handling, packaging, obtaining exact product weights, and incorporating into other food stuffs. It is also possible using the present invention to obtain a flavored dried fruit product which is more uniform in size and shape when compared to the prior art. In addition, the presence of the acidulant, significantly decreases the possibility of contamination and fermentation occurring.

The preferred process of the invention has a number of additional advantages. There is no heating of the flavoring agent so there is little or no loss of the volatile constituents of the flavoring agent which contribute to the flavor and aroma of the final product. Thus, the flavor and aroma of the flavoring agent is more readily retained in the flavored dried fruit product. The flavor and aroma will also penetrate the dried fruit on storage and provide the flavored dried fruit with a more well-developed flavor and aroma. In the preferred process of the invention, no sweetening agent is contacted with or applied to the dried fruit providing a more nutritionally desirable product. The absence of added sweetening agent in the preferred process also provides a product with superior flow properties which makes the product easy to handle, facilitating its use as a consumer product or in further processing as an ingredient in other food stuffs.

The invention also relates to flavored dried fruit products, particularly flavored raisin products produced by the processes of the invention. The flavored dried fruit products of the invention have a more appealing taste, aroma and texture than conventional dried fruit products and thus may be more readily consumable as snack foods or more readily incorporated into foods such as confectionaries, biscuits, cereals, etc.

DETAILED DESCRIPTION OF THE INVENTION

The dried fruits which may be flavored employing the processes of the invention include peach, apple, pear, raisins, prunes, apricots and cherries. Any dried fruit which contains between about 10% to 18% moisture may be employed. The process can be employed on whole or sectioned pieces of dried fruit.

Preferably the dried fruit is a raisin including Thompson seedless raisins, golden seedless raisins, muscat raisins or sultana raisins. The variety of raisin to be used in the processes of the invention will be determined by the desired end product color. Particularly preferred raisins to be used in the processes of the invention are Australian sultanas, VISTA TM raisins from California, seeded raisins from Australia and Dunas seedless raisins from Mexico.

The processing of many of the different dried fruits will require conditions specifically adapted to the dried fruit. The following description will be restricted to the conditions which are particularly suitable for preparing raisin products but it will be understood that persons skilled in the art, given the particular process conditions and steps set forth in this general description as well as in the Examples, could readily adapt the processes of the invention to other dried fruits.

As hereinbefore mentioned, in one embodiment of the invention, a process is provided for preparing a flavored raisin product which includes a one step rehydration of the raisins in a flavor solution. The amount of flavor solution employed is about 10 to 100% by weight of the final product, preferably about 15 to 20% by weight of the final product. The raisins and flavor solution may be mixed, without breaking up the raisins, in a mixer, for example a Hobart. The raisins are rehydrated in the flavor solution for a sufficient time to permit the flavor to stabilize in the raisins; in general, about 3 to 48 hours, preferably 4 to 6 hours, at about 70° to 120° F. The raisins and flavor solution may also be mixed in a steam kettle with a vacuum pump. The raisins and flavor solution are mixed without breaking up the raisins for 5 to 10 minutes, preferably 7 minutes, and then a vacuum of about 15" to 30", preferably 21" to 28" of mercury is applied for about 2 to 4 minutes.

The flavor solution contains water, an acidulant, a flavoring agent and, if desired, it may contain one or both of a sweetening agent or a colouring agent. As discussed above, the acidulant lowers the pH of the flavor solution, significantly decreasing possible contamination by undesirable microorganisms and fermentation. The acidulant also substantially removes the natural flavor of the dried fruit. In addition, the acidulant may also give the dried fruit product a tart taste and assist in breaking down any alkali film that may be on the outer surface of the raisins due to prior processing of the raisin which may inhibit absorption of the flavoring agent. Among the suitable acidulants which may be used in the processes of the invention are tartaric acid, malic acid, citric acid, ascorbic acid, phosphoric acid, or fumaric acid. The selection of a particular acidulant will be made with knowledge of the flavor compatibility of the acidulant with the particular dried fruit to be flavored and the flavoring agent. Thus, flavoring of a particular dried fruit or even a particular raisin using the processes of the invention will require a balancing of the flavoring agent and acidulant to achieve a desired result. For example, the preferred acidulant in the case of flavoring seeded raisins from Australia with cherry flavor is malic acid. Generally, the acidulant is present in an amount of 0.1 to 2.5% by weight of final product. The desired result as well as the nature of the acidulant will determine the actual amount used in any particular incident.

The flavoring agent used in the processes of the invention has a flavor which does not substantially correspond to the flavor of the fruit which is to be flavored in accordance with the processes of the invention. The flavoring agent may be one or more of a natural flavor or an artificial flavor or a combination of natural and artificial flavors. Natural flavors include fruit juices, concentrates and commercially available natural flavors, for example Fries & Cino, Cherry Flavor No. 96243; Naarden's Natural Banana Flavor No. D014654; and BBA's Natural Lemon/Lime Flavor No. 5-9591. Among the artificial flavors that may be used in the process of the invention are Florasynth's Artificial Raspberry Flavor No. W388076, IFF Artificial Pineapple Flavor No. IC578122, BBA's Artificial Coconut Flavor No. M5, IFF's Artificial Pineapple Flavor No. IC578122 combined with BBA's Artificial Coconut Flavor M5 (Pina Colada), and FDO Artificial Passion Fruit Flavor No. 987114. Other natural or artificial fruit flavors that may be used in the process of the invention are orange, grapefruit, tangerine, guava and kiwi. Non-fruit flavors such as peanut butter and cinnamon, may also be used in the process of the invention. The flavoring agent when employed in the first embodiment of the process of the invention should be heat stable at the temperatures at which the process of the invention is carried out. Generally the flavoring agent is present in an amount of about 0.05 to 3% by weight of final product. The desired result as well as the nature of the flavoring agent will determine the actual amount used in any particular incident. The flavoring agent may additionally include vitamin and mineral premixes such as vitamin A, vitamin C, calcium, sodium, thiamine, riboflavin, vitamin B, vitamin $B_2$, etc.

If desired, the flavor solution may contain one or both of a sweetening agent or a coloring agent. The sweetening agent may be a natural sweetener such as sucrose, fructose or glucose or an artificial sweetening agent such as aspartame. Generally, for a natural sweetening agent an amount of about 0 to 15% by weight of the final product is employed. The coloring agent may be a natural or artificial coloring agent. The amount of coloring agent to be added can be determined by visual requirements.

The flavor solution may additionally contain a humectant such as glycerol and sorbitol. Sodium citrate may also be added to the flavor solution to provide a more tart taste, for example when preparing a lemon/-lime flavored dried fruit product.

The treated raisins in the first embodiment of the process of the invention are dehydrated using methods known in the art such as air-oven drying and vacuum drying. In particular, the treated raisins may be dehydrated in a home dehydrator, with adequate ventilation of about 20 m.p.h. wind velocity for a period of about 4 to 6 hours at about 125° to 175° F, preferably 5 to 6 hours at 145° to 150° F, till about 12% moisture remains in the product. The treated raisins prior to drying may also be subjected to a vacuum of about 15" to 30", preferably 21" to 28" of mercury for about 2 to 4 minutes to hasten the absorption of the flavor solution. If the flavor solution contains a sweetening agent it is advantageous to wash the treated raisins prior to drying.

In accordance with a preferred embodiment of the invention, a process is provided for preparing a flavored raisin product which comprises treating raisins with an acidulant being selected from the group consisting of tartaric acid, malic acid, citric acid, ascorbic acid, phosphoric acid and fumaric acid said acidulants being employed in an amount and for a period of time sufficient to provide raisins wherein the natural flavor of the raisin is substantially removed; dehydrating the so treated raisins to obtain a desired moisture content in the raisins, and treating the dehydrated treated raisins with a flavoring agent having a flavor which does not substantially correspond to the natural flavor of the raisins, said flavoring agent being employed in an amount and for a period of time which is sufficient to impart to the raisins a flavor which is substantially the same as the flavoring agent; and so forming a flavored raisin product having a flavor which is substantially the same as the flavor of the flavoring agent and having an outer surface which is substantially non-sticky whereby the flavored raisin product may be easily handled.

As a first step in the second preferred embodiment of the invention, the raisins are treated with an acidulant. The starting raisins are mixed with an aqueous solution containing the acidulant, in a mixer such as a Hobart mixer. The acidulant is employed in an amount, preferably 0.1 to 2.5% by weight of final product, and for a sufficient time to substantially remove the natural flavor of the raisins; in general about 2 to 3 hours, preferably 2.5 hours. The mixing is carried out at a temperature of about 20° C. to 50° C., preferably 20° C. If the starting raisins are coated with oil it is advantageous to wash the raisins prior to mixing to remove the oil coat. The acidulant treated raisins are then dehydrated to obtain a desired moisture content in the treated raisins. In particular, the raisins may be dehydrated in a home dehydrator, with adequate ventilation of about 20 m.p.h. wind velocity for a period of about 1 to 3 hours, preferably 2 hours, at 145° F. to 150° F., preferably about 145° F., until about 12 to 18% moisture, preferably 15% remains in the product. The raisins may be vacuum dried by subjecting to a vacuum of about 18" to 30", preferably 28" of mercury for about 1 to 3 hours, preferably 2 hours, to provide an internal product temperature of 110 to 160° F., preferably 110 to 120° F., until about 12 to 18% moisture, preferably 15% remains in the product. The acidulant treatment step and dehydration step may also be carried out in an apparatus such as a Rota-Cone Dryer and Processor (Paul 0. Abb Inc., Little Falls, N.J.)

The dehydrated treated raisins are mixed with a flavoring agent. The flavoring agent is employed in an amount and for a period of time sufficient to impart to the dehydrated raisins a flavor which is substantially the same as the flavoring agent. Generally, the dehydrated raisins and flavoring agent are mixed in a mixer such as a tumble mixer, to uniformly coat the dehydrated raisins. Generally an amount of flavoring agent which substantially coats the raisins is employed and in particular the flavoring agent may be present in an amount of about 0.5 to 3% by weight of the final product. In the preferred process, of the invention no sweetening agents are contacted or applied to the raisins.

The nature of the acidulants and flavoring agents which may be used in the preferred process of the invention are the same as the acidulants and flavoring agents hereinbefore described for the first embodiment of the process of the invention.

The dried raisins prepared according to the process of the invention can be used as a snack food or confectionery or an ingredient in products such as cakes, cookies, snack foods, confectioneries, dairy products, etc. The dried raisins may also be coated with chocolate.

The following non-limiting examples are illustrative of the present invention:

EXAMPLE 1

A cherry flavor solution containing 4.0g malic acid, 3.0g Fries & Cino Natural Cherry Flavor No. 96243 and 73.0g water was added to 400g of seeded raisins from Australia. The mixture was allowed to stand with intermittent mixing, for 6 hours at room temperature (70° F.) to allow the solution to be absorbed into the raisins. The treated raisins were then dehydrated in a home dehydrator at 145° F. with adequate ventilation of about 20 m.p.h. wind velocity for a period of 5- to 6 hours to 12% moisture remaining in the product. The dried treated raisins were then cooled. The resultant product had a desirable cherry flavor.

EXAMPLE 2

The cherry flavor solution as described in Example 1 was added to 400g of seeded raisins from Australia and mixed in a Hobart mixer for about 10 minutes to allow uniform dispersion of the solution into the raisins. The mixture was then subjected to a vacuum of 21" to 28" of mercury for about 4 minutes to hasten the absorption of the solution. The treated raisins were then dehydrated as described in Example 1. The resultant product had a desirable cherry taste which was similar to the product prepared in accordance with the procedure as described in Example 1.

EXAMPLE 3

A strawberry flavor solution containing 1.20g of citric acid, 0.80g Florasynth Artificial Strawberry Flavor No. WL16103 and 78.0g of water was added to 400g of seeded raisins from Australia. Subsequent processing was carried out as described in Example 1 or Example 2 and the raisin products resulting for each process had a similar desirable strawberry taste.

EXAMPLE 4

A raspberry flavor solution containing 2.25g citric acid, 2.50g Florasynth Artificial Raspberry Flavor No. W388076 and 75.25g of water was added to 400g of seeded raisins from Australia. Subsequent processing was carried out as described in Example 1 or Example 2 and the raisin products resulting from each process had a similar desirable raspberry taste.

EXAMPLE 5

A banana flavor solution containing 1.00g citric acid, 7.00g Naarden Natural Banana Flavor No. DQ14654 and 72.00g of water was added to 400g of VISTA raisins from California. Subsequent processing was carried out as described in Example 1 or 2 and the raisin products resulting from each process had a similar desirable banana taste.

EXAMPLE 6

A pina colada flavor solution containing 3.0g citric acid, 4.0g IFF Artificial Pineapple Flavor No. IC5788122 o.4g BBA Artificial Coconut Flavor No. M%, and 72.6g of water was added to 400g of VISTA raisins from California. Subsequent processing was carried out as described in Example 1 or 2 and the raisin products resulting from each process had a similar desirable pineapple taste.

EXAMPLE 7

A lemon./lime flavor solution containing 5.0g citric acid, 0.5g sodium citrate, 1.5g BBA Natural Lemon/Lime Flavor No. 5-9591 and 73.0g of water was added to 400g of Australian sultana raisins. Subsequent processing was carried out as described in Example 1 or 2 and the raisin products resulting from each process had a similar desirable lemon/lime taste.

EXAMPLE 8

A passion fruit flavor solution containing 3.0g citric acid, 0.8g F.D. & 0 Artificial Passion Fruit Flavor No. 987114, 8.0g passion juice concentrate and 68.2g of water was added to 400g of VISTA raisins from California. Subsequent processing was carried out as described in Example 1 or 2 and the raisin products resulting from each process had a similar desirable passion fruit taste.

EXAMPLE 9

A 2000g sample of Australian sultana raisins was treated with hydrogenated vegetable oil (0.5%) and then washed with hot water and dried. The washed raisins (2060g) were treated with 250ml of a 10% anhydrous citric acid solution for 2 hours and the resulting acidified raisins (2310g) were then dehydrated in a home dehydrator at 145° F. with adequate ventilation of about 20 m.p.h. wind velocity for a period of 3 hours. The resulting dehydrated raisin product (1970-1980g) was substantially free of any natural raisin flavor. A 0.4% flavor solution of Bush Brooke Allen Flavor #5-9591 was added to coat the dehydrated raisin product. The process was repeated using a 2000g sample of Thompson seedless raisins. An Orange Flavored raisin product was prepared employing the described process, using 2000g samples of each of Australian sultana raisins and Thompson seedless raisins and 250ml of an 8% anhydrous citric acid solution and a 0.7% flavor solution of cold pressed California orange oil (Seeley).

As a comparison, the process described in U.S. Pat. No. 1,717,489 to Barlow was also used to prepare lemon flavored and orange flavored raisins. In particular, 2000g samples of Australian sultana raisins and Thompson seedless raisins were washed with hot water and dried. The washed raisin samples (2060g) were then soaked in 250ml of either fresh lemon juice squeezed form Florida lemons or fresh orange juice squeezed from Swaziland oranges and then dehydrated in a home dehydrator at 145° F with adequate ventilation of about 20 m.p.h. wind velocity for a period of 3 hours. The resulting raisins retained their natural flavor characteristics.

The raisin product produced by the process of the invention had a superior orange or lemon flavor when compared to the raisins produced by the process disclosed in Barlow. No difference in the color of the raisin product of the invention and the raisins produced by the Barlow process was observed.

In the case of the orange flavored raisin product of the invention, it had a less sticky texture than the raisins produced using the Barlow process.

The sugar and acid content of the raisin products of the invention and the raisins produced using the Barlow process were calculated.

As shown in Table 1, the orange and lemon flavored raisins produced using the Barlow process have a lower acid content and a higher sugar content when compared to the orange and lemon flavored raisin product of the present invention. If the acid content of the Barlow raisins were increased by soaking the raisins in additional orange or lemon juice, this would necessarily substantially increase the sugar content of the raisins, which is not desirable.

TABLE 1

| | Acid Content (%) | Sugar Content (%) |
|---|---|---|
| Invention | | |
| Orange raisin product | 1 | 71.2%* |

TABLE 1-continued

| | Acid Content (%) | Sugar Content (%) |
|---|---|---|
| Lemon raisin product Barlow | 1.4 | 71.2% |
| Orange Raisins | 0.08–0.28** | 72%* |
| Lemon Raisins | 0.72–1.05*** | 71.35–71.65 |

*71.2% is total sugar content of raisins from General Foods Specifications. Minimum sugar content of orange juice is 6.4%. (The Structure and Composition of Foods, details re publication p. 690).

$$250 \text{ g} \times \frac{.64}{100} = 0.8\%$$

**Minimum Citric Acid Content of Orange Juice is 0.64%. (The Structure and Composition of Foods, p. 690)

$$250 \text{ g} \times \frac{.64}{100} = 1.6/2000 = 0.08\% \text{ acidity}$$

***Minimum Citric Acid Content of Lemon Juice is 5.74%. (The Structure and Composition of Foods, Vegetables, Legumes and Fruits, Vol. II, Winton, A.L., and K. B. Winton, John Wiley & Sons, Inc., London, p. 704).

$$250 \text{ g} \times \frac{5.74}{100} = 14.35/2000 = .007175 = 0.72\%$$

EXAMPLE 10

A 2000g sample of Australian sultana raisins with hydrogenated vegetable oil coating (0.5%) were washed with hot water and dried. The washed raisins were treated with 250ml of an 8% malic acid solution for 2 hours and then dehydrated in a home dehydrator at approximately 145° F. with adequate ventilation of about 20 m.p.h. wind velocity for a period of 3 hours. The raisins may alternatively be dehydrated by vacuum drying by subjecting to a vacuum of about 28" of mercury for a period of 2 hours to provide an internal raisin temperature of approximately 110 to 160° F. The resulting dehydrated raisin product was substantially free of any natural raisin flavor. A 1.0% solution of Natural Cherry Flavor #77742 from F & C International was added to coat the dehydrated raisin product.

EXAMPLE 11

A passion fruit raisin product was prepared employing the process described in Example 10 using 250ml of an 8% citric acid solution and a 0.6% solution of Artificial Flavor #987114 from Fritzsche, Dodge & Olcott.

EXAMPLE 12

A pina colada raisin product was prepared employing the process described in Example 10 using 250ml of 0.8% citric acid and a solution containing 1.0% Artificial Pineapple #IC5-78122 from International Flavor & Fragrances and 0.1% Artificial Coconut #M5 from Bush Brooke Allen.

EXAMPLE 13

A banana flavored raisin product was prepared employing the process described in Example 10 using 250ml of 0.8% citric acid and a 0.5% solution of Natural Banana Flavor #82641 from F & C International.

EXAMPLE 14

A strawberry flavored raisin product was prepared employing the process described in Example 10 using 250ml of 1% malic acid and a solution of Strawberry No. 987148 from FD & 0 International.

While certain representative embodiments of the invention have been described herein for the purpose of illustration, it will be apparent to those skilled in the art that modifications therein may be made without departing from the spirit and scope of the invention.

We claim:

1. A process for preparing a flavored dried fruit product said process comprising:
   (a) treating a dried fruit with an acidulant being selected from the group consisting of tartaric acid, malic acid, citric acid, ascorbic acid, phosphoric acid and fumaric acid, in an amount and for a period of time which is sufficient to substantially remove the natural flavor of the dried fruit;
   (b) dehydrating the treated dried fruit to obtain a desired moisture content; and,
   (c) treating the dried fruit during step (a) or after step (b) with a flavoring agent having a flavor which does not substantially correspond to the natural flavor of the dried fruit, said flavoring agent being employed in an amount and for a period of time which is sufficient to impart to the dried fruit a flavor which is substantially the same as the flavoring agent;
   and so forming a flavored dried fruit product having a flavor which is substantially the same as the flavor of the flavoring agent and having an outer surface which is substantially non-sticky whereby the flavored dried fruit product may be easily handled.

2. A process for preparing a flavored raisin product comprising a one step rehydration of raisins in a flavor solution comprising water, an acidulant, and a flavoring agent, and optionally comprising one or both of a sweetening agent and a colouring agent, said flavor solution being employed in an amount of about 10 to 100% by weight of final product, said acidulant being selected from the group consisting of tartaric acid, malic acid, citric acid, ascorbic acid, phosphoric acid and fumaric acid and being employed in an amount of 0.1 to 2.5% by weight of final product, said flavoring agent having a flavor which does not substantially correspond to the natural flavor of the raisins, said rehydration step being employed for a period of time to permit the flavor solution to stabilize in the raisins and to impart to the raisins a flavor which is substantially the same as the flavoring agent, washing the rehydrated raisins to substantially remove any residual of the flavor solution on the outer surface or skin of the raisins, and a one step dehydration of the washed rehydrated raisins to obtain a desired moisture content, and so forming a flavored raisin product having a flavored meat comprising the flavor of the flavoring agent, and having an outer surface which is substantially non-sticky whereby the raisin product may be easily handled.

3. A process for preparing a flavored raisin product, said process comprising treating raisins with an acidulant being selected from the group consisting of tartaric acid, malic acid, citric acid, ascorbic acid, phosphoric acid and fumaric acid, said acidulant being employed in an amount and for a period of time sufficient to provide raisins wherein the natural flavor of the raisins is substantially removed; dehydrating the so treated raisins to obtain a desired moisture content in the raisins, and treating the dehydrated raisins with a flavoring agent having a flavor which does not substantially correspond to the natural flavor of the raisins, said flavoring agent being employed in an amount and for a period of time which is sufficient to impart to the raisins a flavor which is substantially the same as the flavoring agent; and so forming a flavored raisin product having a flavor which is substantially the same as the flavor of the flavoring agent and having an outer surface which is substantially non-sticky whereby the flavored raisin product may be easily handled.

4. A process as claimed in claim 3, wherein the acidulant is employed in an amount of 0.1 to 2.5% by weight of final product and the flavoring agent is employed in an amount of .05 to 3% by weight of final product.

5. A process as claimed in claim 3 or 4 wherein the flavoring agent is one or more of a natural and an artificial cherry, strawberry, raspberry, banana, pineapple, coconut, lemon/lime, orange, grapefruit, tangerine, guava, kiwi, or passion fruit flavor.

6. A flavored raisin product produced by a process comprising treating raisins with an acidulant being selected from the group consisting of tartaric acid, malic acid, citric acid, ascorbic acid, phosphoric acid and fumaric acid, said acidulant being employed in an amount and for a period of time sufficient to provide so treated raisins wherein the natural flavor of the raisins is substantially removed; dehydrating the so treated raisins to obtain a desired moisture content in the raisins, and treating the dehydrated raisins with a flavoring agent having a flavor which does not substantially correspond to the natural flavor of the raisins, said flavoring agent being employed in an amount and for a period of time which is sufficient to impart to the raisins a flavor which is substantially the same as the flavoring agent; and so forming a flavored raisin product having a flavor which is substantially the same as the flavor of the flavoring agent and having an outer surface which is substantially non-sticky whereby the flavored raisin product may be easily handled.

7. A process as claimed in claim 1, wherein no sweetening agent is contacted with or applied to the dried fruit.

* * * * *